United States Patent
Wagner et al.

[11] 3,791,306
[45] Feb. 12, 1974

[54] VEHICLE GUIDEWAY SWITCHING MECHANISM

[75] Inventors: Joseph F. Wagner, North Cape May, N.J.; Peter M. Noble, Valencia, Pa.

[73] Assignee: Rohr Industries, Inc., Chula Vista, Calif.

[22] Filed: Oct. 18, 1971

[21] Appl. No.: 189,888

[52] U.S. Cl. .............................. 104/130, 104/105
[51] Int. Cl. ............................................ B61b 13/04
[58] Field of Search ..... 104/96, 105, 100, 101, 102, 104/103, 104, 130; 246/387, 389

[56] References Cited
UNITED STATES PATENTS

| | | | |
|---|---|---|---|
| 3,672,308 | 6/1972 | Segar | 104/130 |
| 1,286,042 | 11/1918 | McClure | 104/130 |
| 2,903,972 | 9/1959 | Schutze | 104/130 |
| 3,106,898 | 10/1963 | Prosin | 104/130 |
| 2,997,004 | 8/1961 | Rosenbaum | 104/130 |

FOREIGN PATENTS OR APPLICATIONS

| 1,274,896 | 9/1961 | France | 104/130 |
|---|---|---|---|

Primary Examiner—Gerald M. Forlenza
Assistant Examiner—D. W. Keen

[57] ABSTRACT

This disclosure relates to a guideway switch for self-guided vehicles having at least two selectable routes of travel. The switch includes at least two movable guide beams each having one end pivotally connected with the stationary guide rails of a roadway having a horizontal supporting surface on each side of the guide rails. A plurality of wheeled carriers are disposed below the horizontal supporting surfaces and are guided by a trackway. Each wheeled carrier includes a vertically adjustable support which has one end rigidly connected to the movable guide beams and which has the other end rotatably and slidably connected to the wheeled carrier. An actuating means includes an electric motor which drives a ball bearing screw drive mechanism. The screw drive mechanism moves the wheeled carriers and, in turn, shifts the movable beams to selected positions to establish the desired route of travel over the roadway for the self-guided vehicles.

5 Claims, 4 Drawing Figures

VEHICLE GUIDEWAY SWITCHING MECHANISM

This invention relates to a guideway switch and more particularly to a switching arrangement for selectively establishing the route of travel for self-steering types of transportation vehicles moving along a vehicle roadway having a central guide rail and horizontal supporting surfaces. The switching arrangement comprises at least a first and a second movable guide beam, each of which is pivotally connected to the stationary guide rails of the roadway. Each movable guide beam is supported by a plurality of wheeled carriers each of which rolls on a trackway between a first and a second extreme position. An actuating mechanism including an electric motor and a ball bearing drive screw are connected to one of the wheeled carriers to select the route of travel for a vehicle moving along the roadway. The guide beams are positively locked in each extreme position by locking devices.

With the ever-increasing traffic problems besieging the megalopolises of the world, the various transit authorities are considering other transportation modes for efficiently and effectively moving the masses in and about the metropolitan areas. One solution appears to lie in mass or rapid transit operations which not only have the required capacity but also have the necessary speed for conveying a large number of people from place to place, both quickly and safely. One type of a proposed mass or rapid transit system employs rubber tired vehicles which travel along a guided roadway. In general, the roadway which may be elevated, placed underground or at street level, includes a pair of supporting surfaces which are straddled by a central guide rail. The guide rail takes the form of a continuous beam having a pair of complementary vertical side portions. The vertical side portions of the guide rail or beam accomodate the guide wheels which steer or guide the vehicles as they are propelled along the roadway. One major shortcoming of a guided rubber tired vehicle system resides in the inability to quickly and effectively change its route of travel. While various attempts have been proposed for switching the vehicles from one route to another, none of these previous schemes has successfully solved this switching problem. First, an acceptable guide switch must operate quickly and rapidly when the guideway is switched from one route of travel to another route of travel so that closely spaced vehicles may move along alternate routes of travel. Second, it will be appreciated that the mass or bulkiness of the switch should be held to a minimum in order to effectively and efficiently accomplish a fast switching operation. Third, in order to permit the vehicles to pass through the guideway switch without requiring any appreciable reduction in their speed, the alignment of the stationary guide rail with the movable guide beam must be near perfect. Fourth, minimum size gaps or spacings should exist between the ends of the stationary and movable guideways in order to allow for high speed operations. Fifth, the guide beam must be stable throughout its entire length since lateral stresses and forces are exerted on the guide beam when a vehicle traverses the switch. Finally, for the purpose of safety, it is required that the movable guide beam be positively locked in position in order to eliminate the possibility of a vehicle running an open or partially open switch.

Accordingly, it is an object of this invention to provide a novel guideway switch for use in a self-steering transportation system.

Another object of this invention is to provide a novel switching mechanism for selectively establishing the route of travel for a self-guided transportation vehicle.

A further object of this invention is to provide a new guideway switch for mass and/or rapid transit operations.

Yet another object of this invention is to provide a guided vehicle switching arrangement having a minimum switch operating time and a maximum vehicle pass-through time.

Still a further object of this invention is to provide an improved guideway switch having at least two movable guide beams for selectively establishing alternate routes of travel and having locking devices for ensuring that the guide beams are positively locked in position.

Still another object of this invention is to provide a guideway switching arrangement having at least two movable switching members each of which is pivotally connected at one end of the guide rail and which is supported at selected points along their length by a plurality of wheeled carriers which roll along a trackway.

Yet a further object of this invention is to provide a switching arrangement having a plurality of movable guide beam sections, an actuating means including an electric motor and a ball bearing screw drive mechanism for selectively moving the movable guide rail sections in relation to the plurality of fixed guide rails and locking devices for positively locking the movable guide beam sections in relation to the fixed guide rails.

Still yet another object of this invention is to provide a unique monorail switching arrangement having a pair of movable guide beams each of which is structurally locked at selective points along its length.

Yet another object of this invention is to provide a novel guideway switch which is economical in cost, simple in construction, reliable in operation, durable in use and efficient in service.

In the attainment of the foregoing objects a guideway switch has been developed for self-guiding vehicles and comprises a pair of movable guide beams which are fabricated from a pair of elongated upstanding channel members. Each of the guide beams is pivoted at one end to the fixed guide beam of a roadway having supporting surfaces. Each of the guide beams is supported at three points along its length. Each suporting point includes a wheeled carrier or dolly which is laterally moved along a fixed trackway. An adjustable upstanding member is secured to the underside of the guide beams and is rotatably and slidably connected to the carriers. An actuating mechanism including an electric motor is coupled through a clutch-brake to a ball bearing screw drive mechanism which moves the carriers and, in turn, the movable guide beams between two extreme positions. A locking device locks the other end of each of the guide beams in either extreme position. In addition, a locking device is cooperatively associated with the carriers and locks the carriers in place so that lateral forces exerted by a passing vehicle are unable to displace the movable guide beams. A shock absorber is disposed adjacent each extreme position for reducing mechanical shock impact when the movable guide beams reach either of their extreme positions.

Other objects, features and advantages of the present invention will become more apparent from the following description of a preferred embodiment described with reference to the accompanying drawings forming a part of this specification, in which.

Figure 1:
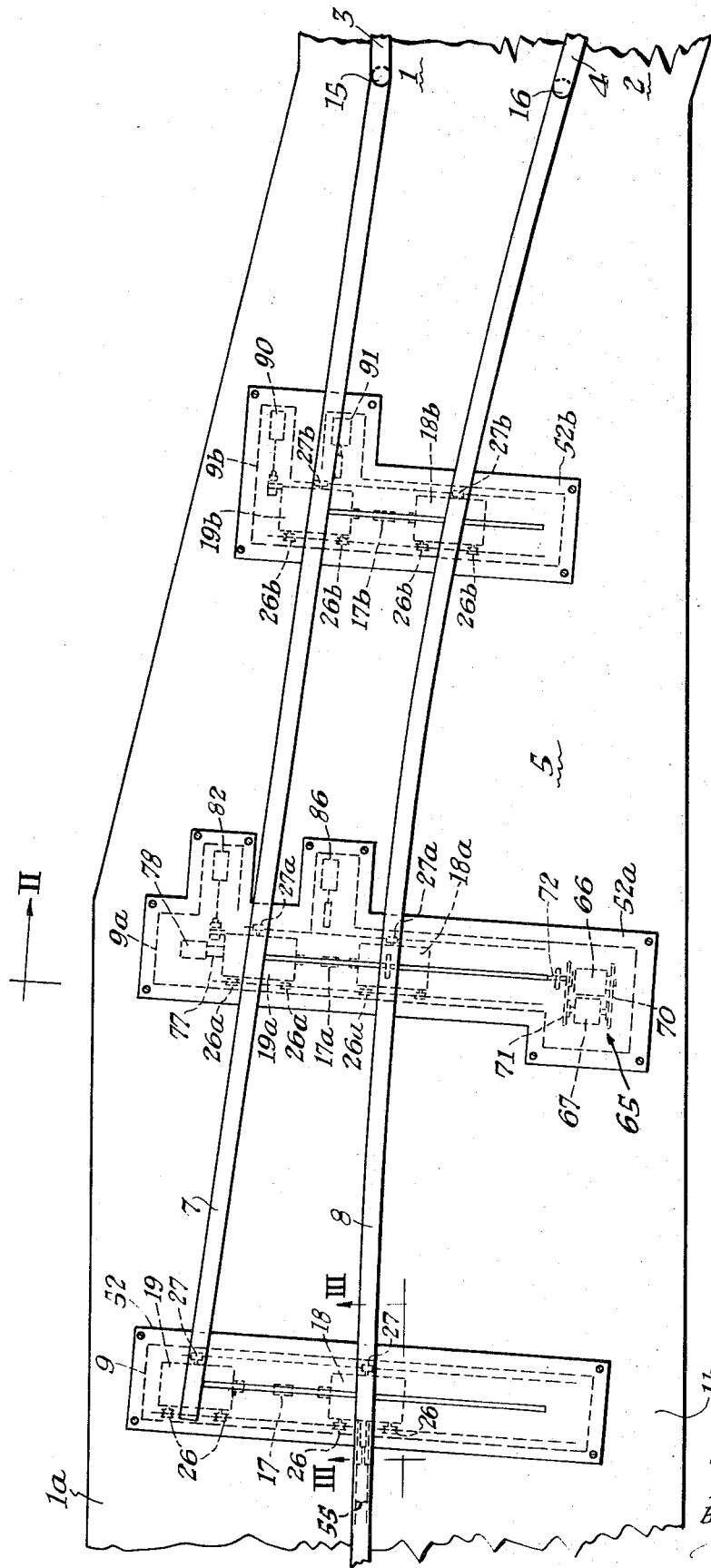
FIG. 1 is a top plan view of a portion of a guided roadway having a switching section for accommodating self-steering rubber tired vehicles which may be adapted for use in a mass and/or a rapid transit system.

Referring now to the drawings, and in particular to FIG. 1, there is shown a roadway for guided rapid transit vehicles having a main line 1 and a turnout 2. The main line 1 includes a pair of spaced running or supporting surfaces which straddle a fixed guide rail 3. Similarly, the turnout 2 includes a fixed central guide rail 4 and a wheel supporting surface disposed on either side thereof. The horizontal surfaces are adapted to support the load carrying wheels, for example, of rubber tired rapid transit vehicles and may be preferably constructed of reinforced or prestressed concrete. The central guide rails 3 and 4 are fabricated from a pair of elongated U-shaped channel members and are securely mounted to the top of the roadway in any conventional manner. The outer vertical sides of the channel members are engaged by the guide wheels of the rapid transit vehicles so that the vehicles are maintained centered on the roadway. The main line 1 and turnout 2 converge into a switching area or section generally characterized by the reference numeral 5. The switching area includes a wheel supporting surface which also may be constructed of reinforced concrete. The switching function is accomplished by a pair of movable guide beams 7 and 8 which selectively establish a route of travel between the main line 1 or the turnout 2. That is, guide beam 7 sets up a main line route of travel for the vehicles while guide beam 8 allows the vehicle to move between turnout 2 and the main line. In viewing FIG. 1, it will be noted that a guideway switch is in its reverse position so that a route of travel is established between the left-hand main line 1 and the turnout 2. Like the stationary guide beams, both of the movable switching guide beams 7 and 8 are preferably constructed of a pair of elongated metal C-shaped channel members. The movable guide beam 7 is substantially straight while the guide beam 8 is slightly curved to agree with the curvature of the turnout guide beam 4. In viewing FIG. 2, it will be noted that the guide beam 7 includes a pair of C-shaped channel members 10 and 11, each having its top and bottom flanges facing each other. A metal cross rib or strut 12 is welded at selected points along the length of the channels 10 and 11 to maintain proper relationship with each other and to increase the rigidity of the beam. As shown in phantom in FIG. 2, the guide wheels extend from the undercarriage of the rapid transit vehicles and engage the outer vertical surfaces of the web portions of the channel members 13 and 14. Similarly, the guide beam 8 is fabricated from a pair of C-shaped channel members 13 and 14 which are interconnected by cross ribs 15 which serve to strengthen the beam structure.

As shown in FIG. 1, one end of each of the movable guide beams is pivotally connected with the respective fixed or stationary guide rails of the roadway. The right-handed end of the movable guide beam 7 is pivotally coupled at point 15 to the main line guide rail 3 while the right-handed end of the movable guide beam 8 is pivotally coupled at point 16 to the turnout guide rail 4. The guide beams 7 and 8 are carried by a plurality of wheel carriers which are located at selected points along the length of the beams. In practice, each movable guide beam is supported at three points, namely, the other end of guide beam 8 is carried by a terminal follower carrier 18. In addition, the guide beam 8 is also carried by an intermediate power-driven carrier 18a and an intermediate follower carrier 18b. Similarly, the other end of guide beam 7 is carried by a terminal follower carrier 19, and the beam 7 is also carried by an intermediate power-driven carrier 19a and a follower carrier 19b as will be described presently. Since the movable guide beams are shifted in unison, each pair of carriers is interconnected by a suitable adjustable mechanical linkage. For example, carriers 18 and 19 are connected by adjustable turnbuckle 17 while carriers 18a and 19a are connected by adjustable turnbuckles 17a and 17b, respectively. Each of the carriers is substantially identical in construction and, therefore, it only appears necessary to describe one of the carriers in great detail.

Figure 3:
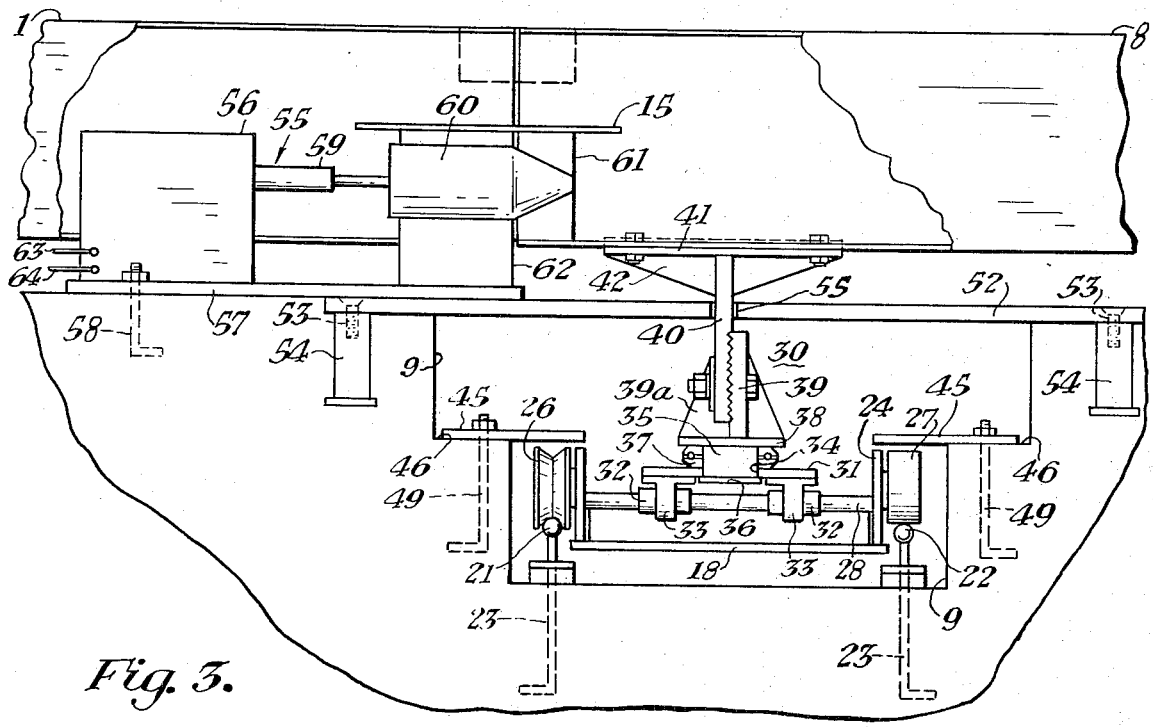
FIG. 3 is an enlarged sectional view taken along the lines III—III of FIG. 1 illustrating one of the follower carrier assemblies for the guide beams.

In viewing FIG. 3, it can be seen that the wheel carrier 18 preferably takes the form of a dolly which rides on a trackway which includes two elongated parallel rails 21 and 22. The carrier 18 is preferably disposed below the running surface of the roadway and is located within an elongated pit or trough 9 formed in the roadway. The elongated track rails 21 and 22 are disposed substantially perpendicular to the longitudinal axis of the movable guide beams and are securely fastened to the reinforced concrete structure by tie-rods 23 which are embedded into the concrete. The tops of the rails 21 and 22 are circular in cross section and provide running surfaces for the wheels of the dolly 18. The dolly 18 includes a box-like frame 24 constructed of a pair of side plates and a pair of end plates as well as a bottom plate all of which are preferably welded together. The side plates are fitted with roller bearing wheels which roll on the rails 21 and 22. In viewing FIGS. 1 and 3, it will be noted that the left side of dolly 19 is provided with two V-grooved wheels 26 while the right side of dolly 19 is provided with a single smooth surface wheel 27. The V-grooved wheels 26 ensure that the dolly will remain on the trackway and the flat wheel 27 ensures that the dolly will not become cocked relative to the trackway. The dolly 18 is provided with a pair of slide rods, one of which is characterized by numeral 28 in FIG. 3. The ends of slide rod 28 are secured, such as by being welded, to the inner surfaces of the side plates of the box-like frame 24. Each of the slide rods cooperates with a pair of bearing members which are carried by the underside of a rectangular base plate 31. For example, the cylindrical slide rod 28 passes through a pair of selflubricating sleeve bearings 32 which are press-fitted in the respective apertures of depending lugs 33. The base plate 31 also includes a central aperture 34 into which is fitted a thrust bearing shaft 35. The lower end of shaft 35 is prevented from being lifted out of aperture 34 by means of an enlarged plate 36 secured to the bottom thereof. An axial thrust bearing 37 surrounds the intermediate portion of shaft 35 and allows a certain amount of rotational movement to occur as the guide beam 7 is moved between its two extreme positions. The sliding and rotational movement is necessary in order to allow the carriers to move in a straight path along their trackways. The thrust bearing 37 is confined in place by an upper plate member 38 which is secured to the top of the thrust shaft 35. The upper surface of the plate member 38 carries a lower vertical support plate 39 which has a series of horizontally disposed vertically aligned teeth formed on one of its flat surfaces. The lower support plate 39 is reinforced by two triangular end plates, one of which is characterized by numeral 39a. The end plates 39a are secured, such as being welded, to both the vertical support plate 39 as well as the horizontal plate member 38. The vertical support plate 39 cooperates with an upper vertical support plate 40 which also includes a series of horizontally disposed vertically aligned teeth formed on one of its flat surfaces. The two series of teeth are aligned and a pair of draw bolts, nuts and appropriate washers (one of which is shown in FIG. 3) securely hold the plates 39 and 40 in fixed relationship to each other. The beam 7 is securely connected to the upper end of the adjustable upper support plate 40 by means of a cradle-like structure which is formed by a horizontal plate 41 and a pair of triangular side plates, one of which is shown at 42 in FIG. 3. The top of the upper vertical plate 40 is preferably welded to the underside of support plate 41 while the bottom flanges of the C-shaped channels 12 and 13 forming the movable beam 7 are secured, such as being bolted, to the plate 41. The lower central portions of the triangular plates 42 are welded to the plate 40 while the upper peripheral edges of the plates 42 embrace the lower outer surfaces of the channel members 12 and 13. As shown in FIG. 3, a pair of longitudinal restraining plates 45 are secured to the upper surface step-off portions 46 formed at approximately the intermediate level of the trough 9. The retaining plates 16 are secured by tie-bolts 49 which are embedded in the concrete structure. As shown, one of the plates 45 extends over the wheels 26 while the other plate 45 covers the wheel 27, so that the carrier 18 is prevented from being lifted off the trackway and being derailed. A slotted steel cover plate 52 is fitted over the top of the elongated trough 9 and is securely held in place by flat head scress 53 and anchors 54 which are embedded in the concrete structure. The width of the elongated slot 55 is slightly greater than the thickness of the upper supporting plate 40 so as to minimize the possibility of foreign matter entering the trough. If necessary, the slot may be fitted with an elongated flexible flap, such as, a rubber strip or the like, in order to prevent the entrance of dirt, dust, grease, oil, water, etc. Preferably, the upper surface of the cover 52 is aligned with the top of the concrete structure so that a smooth running surface is provided for the running tires of the vehicles.

In viewing FIG. 3, it will be noted that the guideway switch is locked in its reverse position by an electromagnetic locking device 55. The electromagnetic locking device 55 includes an energizable solenoid coil which is contained within housing 56. The housing 56 is suitably secured in any conventional manner to mounting plate 57. The plate 57 is secured to the upper surface of the concrete structure by tie-bolts 58, one of which is shown in FIG. 3. The locking device includes a spring-biased plunger 59 which is normally urged outward as shown in FIG. 3. The plunger 59 is connected to a shot-pin 60 which is adapted to move into and out of a conical aperture of a locking block 61 which is secured to the end of beam 8. The shot-pin 60 is guided by a bearing block 62 which is secured to the top of the mounting plate 57. The locking device will remain in the position as shown in FIG. 3 until power is supplied to the solenoid coil over leads 63 and 64. The energization of the solenoid coil causes the attraction of the plunger 59 which, in turn, results in the withdrawal of the shot-pin 60 from the locking block 61.

Figure 4:
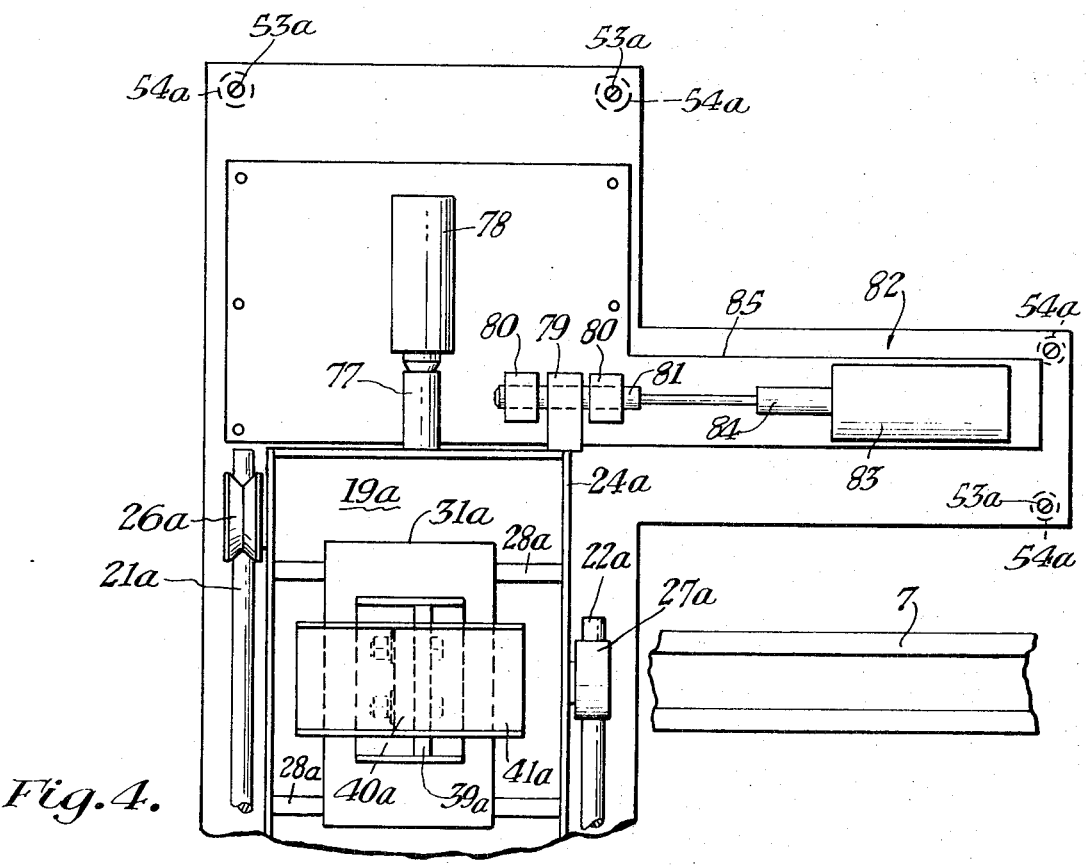
FIG. 4 is a partial top plan view on an enlarged scale of the master carrier assembly.

As previously mentioned, each of the movable guide beams 7 and 8 is supported by two additional carriers which are located at intermediate points along the length of the beams. For example, the movable guide beam 8 is also supported by a power-driven wheeled carrier 18a and a third follower wheeled carrier 18b, while the movable guide beam 7 is also supported by a second power-driven wheeled carrier 19a and a follower carrier 19b. These latter carriers are also disposed below the running surface of the roadway and are located within longitudinal troughs 9a and 9b formed in the concrete structure of the switch area. Like carriers 18 and 19, the carriers 18a and 18b, as well as 19a and 19b, are provided with V-grooved wheels 26a-26b and smooth surface wheels 27a-27b, respectively. As shown in FIG. 4, the carrier 19a rides on rails 21a and 22a of a trackway identical to that formed by rails 21 and 22. The remainder of the structure of the supporting assemblies of carriers 18a and 18b is substantially identical to that of the supporting assembly of carrier 18 and, therefore, as previously mentioned, no further detailed description is deemed to be necessary. That is, the carrier 19a includes a box-like structure 24a, slide rods 28a, base plate 31a, upper and lower vertical plates 39a and 40a, horizontal support plate 41a, as well as the other parts and elements which have ben previously described.

Figure 2:
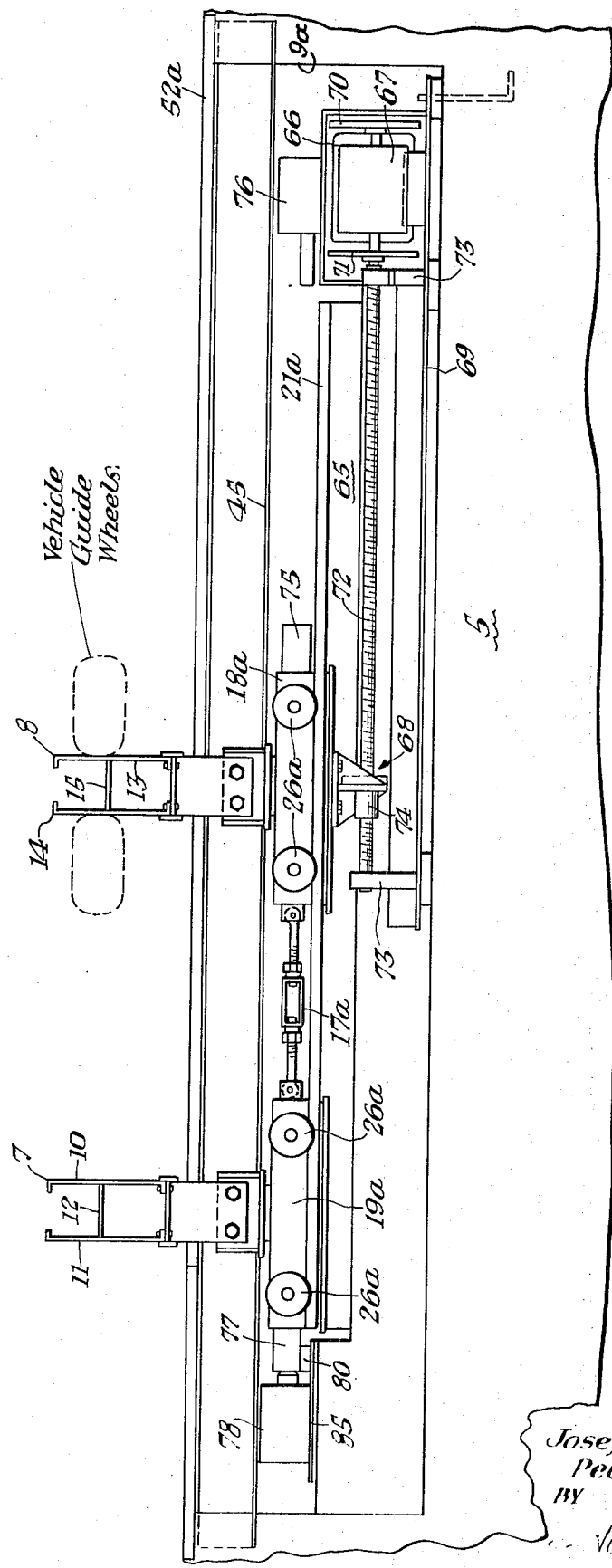
FIG. 2 is an enlarged sectional view taken along the lines II—II of FIG. 1 illustrating the central power driven carrier assembly for the guide beams.

Turning now to FIGS. 1 and 2, it will be noted that the trough 9a of the power-driven carriers 18a and 19a also includes an actuating mechanism generally characterized by numeral 65. The actuating mechanism 65 includes a reversible electric drive motor 66, an electrical clutch-brake device 67 and a ball bearing screw drive mechanism 68 which are supported on a mounting plate 69 secured to the bottom of the trough 9a. Thus, the entire actuating mechanism may be removed as an entire unit and quickly replaced with a new mechanism within a minimum amount of time and effort. The electric motor 66 is mechanically coupled to the clutch-brake device 67 through a first gear train 70. A second gear train 71 couples the clutch-brake device 67 to the threaded shaft 72 of the ball bearing screw drive device 68. The elongated threaded shaft 72 is supported at each end by a bearing block 73, each of which is mounted to the top of plate 69. The threaded shaft 72 cooperates with a nut 74 which moves along the length of the shaft when it is rotated. The nut 74 includes an endless row of ball bearings so that frictional loss and mechanical wear are minimized. The nut 74 is carried by a bracket which is bolted to the bottom plate of the frame of the wheeled carrier or dolly 18a.

As shown, the outer end of dolly 18a is provided with a bumper block 75 which cooperates with a telescopic shock absorber 76 to reduce the impact shock when the guideway switch is moved to its normal position.

Similarly, the outer end of dolly 19a includes a bumper block 77 which is shown in engagement with the telescopic shock absorber 78, see FIGS. 1 and 4. The right-hand corner of the outer end of dolly 19a is also provided with an aperture lug 79 which is shown in alignment with a pair of upstanding lugs 80. As shown, a shot-pin 81 is passed through the apertures of the three lugs so that the carrier 19a is locked in position. The shot-pin 81 is controlled by an electro-magnet locking device 82 which includes an energizable solenoid coil enclosed in housing 83 mounted on bearing plate 85 which also carries the shock absorber 78 and the two locking lugs 80. The solenoid coil moves a spring biased plunger 84 which is coupled to the shot-pin 81. In viewing FIG. 1, it will be noted that another locking device 86 is located within the central pit 9a. This latter locking device locks the carrier 19a in place when the guideway switch is moved to its normal position. A slotted cover plate 52a is secured to the top of the running surface bolts 53a and anchors 54a and operates to protect the various parts and elements from damage.

In viewing FIG. 1, it can be seen that the dollies 18b and 19b and the locking arrangement are substantially identical to the above-described dollies 18a and 19a and locking devices 82 and 86. An electromagnetic locking device 90 secures the wheeled carrier 19b in place when the guideway switch is in its reverse position as shown while an electro-magnetic locking device 91 locks the wheeled carrier 19b in position when the guideway switch is in its normal position. The three-point locking arrangement not only ensures that the guideway switch is positively locked in either of its extreme positions but also results in a highly stable structure so that lateral forces or stresses exerted by vehicles moving through the switch are incapable of deforming or deflecting the movable guide beams.

In describing the operation it will be assumed that the guideway switch is completely assembled and functioning properly, that the movable beams have been perfectly aligned by adjusting the vertically movable supporting plates and the horizontally adjustable turnbuckles, and that the various parts and elements of the switch are in the positions as shown in FIG. 1. Under this condition it will be seen that the movable guide beam 8 is initially aligned with the stationary guide beam and the switch is positively locked in place by shot-pins of locking devices 55, 82 and 90. Thus, a rapid transit vehicle may safely and rapidly move through the switching area 5 without an appreciable reduction of speed and without any danger of derailment.

It will now be assumed that the initial vehicle has passed through and has cleared the switching area and that a subsequent vehicle is selected to travel along the main line route. Thus, it is now necessary to shift the switch to its normal position by moving beam 7 out of engagement with the main line beam and by moving beam 8 into engagement with the main line beam. Prior to moving the switch beams the switch must be unlocked by energizing the solenoid coils of the locking devices 55, 82 and 90. The energization of the coil of locking device 55 retracts the shot-pin 60 from the locking block 61 while the energization of the locking devices 82 and 90 retracts their shot-pins from the apertured lugs of carriers 19a and 19b, respectively. Now the motor 66 and clutch of device 67 are energized. The gears 70 and 71 and the clutch 67 transmit the rotation movement of the motor to the threaded shaft 72.

The rotational movement of the shaft 72 causes the spiral threads to coact with the endless row of ball bearings so that the nut 74 is drawn toward the motor and clutch-brake assembly, as viewed in FIGS. 1 and 2. The nut 74 pulls the dolly 18a and, in turn, dolly 19a to the right on the trackway as viewed in FIG. 2. The other dollies, namely, carriers 18, 19, 18b and 19b, follow and roll along their respective trackways. Thus, the switch beam 7 pivots about pin 15 and is moved out of engagement with the stationary guide beam while the beam 7 pivots about pin 16 and its free end 17 begins to move toward the stationary beam. As the switch nears its normal position, the bumper block 75 carried by dolly 18a engages the piston of the shock absorber 76 so that some kinetic energy is removed prior to the switch reaching its normal position. This allows for smoother and quieter operation and reduces the stresses and strains on components of the switch. When the movable beam 7 is perfectly aligned with the stationary beam, the motor and clutch are deenergized and the brake of device 67 is energized. The energization of the brake ensures that the shock absorber will not move the beam 7 out of alignment with the main line beam prior to locking of the switch. The switch is locked in its normal position simply by deenergizing the solenoid coils of the locking devices 55, 86 and 91. The deenergization of the locking device 55 causes the spring loaded plunger 59 to insert the shot-pin 60 into a locking block (not shown) which is welded to the end of beam 7. The intermediate points of the beam are locked by the deenergization of devices 86 and 91 which results in their shot-pins engaging the apertured lugs carried by the dollies 19a and 19b and a pair of lugs (not shown) located in alignment with the shot-pins of devices 86 and 91. After lockup the brake may be deenergized since the locking devices prevent the shock absorber from moving the switch. Thus, the guide switch has been moved to its normal position, and the subsequent rapid transit vehicle will travel along the main line 1 of the roadway.

The operational steps are reversed when it is desired to again shift the guideway switch to its reverse position. The switch is unlocked by energizing locking devices 55, 86 and 91. Then, the switching beams are shifted by energizing motor 66 and clutch of the device 67. Once the beams are shifted the motor and clutch are deenergized while the brake is energized. The switch is locked by deenergizing locking devices 55, 82 and 91 and the brake is deenergized.

From the foregoing description, it is apparent that the present switching arrangement provides for switching or establishing the path of travel of self-guided vehicles. The switching operation is accomplished in a minimum amount of time so that short vehicle headway clearances may be maintained. The switching arrangement also ensures that guideway switches are positively locked into place at a number of points along their lengths so that a mechanically stable structural arrangement results. Along with its stability, the switch has long life and is capable of approximately 700,000 switching operations per year. The switch is virtually unaffected by environmental conditions, and the various parts and components are effectively protected against dirt, dust, grease and the like by the cover members.

It will be appreciated that while the movable beams of the guideway switch have been illustrated as a pair of steel C-shaped members, it is understood other types of materials and other shapes of guide members may be used in practicing our invention. Further, while a turn-out switching arrangement has been shown, our invention of course is not limited to only such an arrangement. A crossover switch may be made by employing two of the illustrated switches connected in back-to-back relationship. In addition, other equivalent parts may be used in the place of those shown and disclosed in the application. For example, the solenoid operated shot-pin locking devices may be replaced by pneumatic operated locking devices or by miniature screw drive devices which are similar to the actuating mechanism 65.

It will be appreciated that numerous other changes may be made in the above-described construction without departing from the spirit and scope of the invention, and thus it is intended that all the subject matter contained in the foregoing description or shown in the accompanying drawings should be interpreted as illustrative rather than in a limiting sense.

Having thus described our invention, what we claim is:

1. A guideway switch for a vehicle traversing a roadway having supporting surfaces disposed on either side of a central guide beam comprising, a plurality of movable guide beams for selectively establishing a route of travel along said guideway, a plurality of carriers disposed below the level of said supporting surfaces of said roadway and connected to said movable guide beams, and an actuating mechanism disposed below the level of said supporting surfaces of said roadway and connected to one of said plurality of said carriers whereby said movable guide beams are shifted between selected positions to establish the routes of travel, said movable guide beams pivoted at one end and a carrier disposed at the other end of each of said movable guide beams and a pair of carriers disposed intermediate the ends of each of said movable guide beams, the other end of each of said movable guide beams being locked in the selected positions by a linear actuated lock rod and each of said pair of carriers being also locked in the selected positions by a linear actuated lock rod.

2. A guideway switch for a vehicle traversing a roadway having supporting surfaces disposed on either side of a central guide beam comprising, a plurality of movable guide beams for selectively establishing a route of travel along said guideway, a plurality of carriers disposed below the level of said supporting surfaces of said roadway and connected to said movable guide beams, and an actuating mechanism disposed below the level of said supporting surfaces of said roadway and connected to one of said plurality of said carriers whereby said movable guide beams are shifted between selected positions to establish the routes of travel, said actuating means including a power driven ball bearing screw drive mechanism, said power driven ball bearing screw drive mechanism including a nut having an endless train of bearings which cooperates with a threaded shaft.

3. A guideway switch for a vehicle traversing a roadway having supporting surfaces disposed on either side of a central guide beam comprising, a plurality of movable guide beams for selectively establishing a route of travel along said guideway, a plurality of carriers disposed below the level of said supporting surfaces of said roadway and connected to said movable guide beams, and an actuating mechanism disposed below the level of said supporting surfaces of said roadway and connected to one of said plurality of said carriers whereby said movable guide beams are shifted between selected positions to establish the routes of travel, said carriers taking the form of dollies which roll on a fixed trackway, said dollies including a plurality of wheels some of which are grooved to match the engaging surface of said trackway, said wheels being held onto the trackway by a pair of elongated retaining plates which are disposed adjacent the tops of said wheels.

4. A guideway switch for a vehicle traversing a roadway having supporting surfaces disposed on either side of a central guide beam comprising, a plurality of movable guide beams for selectively establishing a route of travel along said guideway, a plurality of carriers disposed below the level of said supporting surfaces of said roadway and connected to said movable guide beams, and an actuating mechanism disposed below the level of said supporting surfaces of said roadway and connected to one of said plurality of said carriers whereby said movable guide beams are shifted between selected positions to establish the routes of travel, a shock absorber located at the selected positions to minimize energy shocks when said movable beams reach the selected position.

5. A guideway switch for a vehicle traversing a roadway having supporting surfaces disposed on either side of a central guide beam comprising, a plurality of movable guide beams for selectively establishing a route of travel along said guideway, a plurality of carriers disposed below the level of said supporting surfaces of said roadway and connected to said movable guide beams, and an actuating mechanism disposed below the level of said supporting surfaces of said roadway and connected to one of said plurality of said carriers whereby said movable guide beams are shifted between selected positions to establish the routes of travel, each of said carriers being connected to said movable guide beams by a vertically adjustable support which has one end rigidly secured to said movable guide beam and which has the other end slidably connected to said carriers.

* * * * *